(12) United States Patent
Rinne et al.

(10) Patent No.: US 10,834,593 B2
(45) Date of Patent: Nov. 10, 2020

(54) METHOD, APPARATUS AND COMPUTER PROGRAM PRODUCT FOR ACCESSING A LOCAL AREA SCOPED NETWORK HAVING NON-ACCESS-STRATUM PROCEDURES

(71) Applicant: Nokia Solutions and Networks Oy, Espoo (FI)

(72) Inventors: Mika Petri Olavi Rinne, Espoo (FI); Gyorgy Tamas Wolfner, Budapest (HU); Jari Pekka Mustajarvi, Espoo (FI); Janne Petteri Tervonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/063,511

(22) PCT Filed: Dec. 19, 2016

(86) PCT No.: PCT/EP2016/081703
§ 371 (c)(1),
(2) Date: Jun. 18, 2018

(87) PCT Pub. No.: WO2017/103256
PCT Pub. Date: Jun. 22, 2017

(65) Prior Publication Data
US 2018/0376411 A1    Dec. 27, 2018

(30) Foreign Application Priority Data

Dec. 18, 2015    (WO) ................. PCT/EP2015/080560

(51) Int. Cl.
*H04W 4/00*        (2018.01)
*H04W 12/06*       (2009.01)
(Continued)

(52) U.S. Cl.
CPC ....... *H04W 12/0602* (2019.01); *H04L 5/0053* (2013.01); *H04W 48/14* (2013.01);
(Continued)

(58) Field of Classification Search
None
See application file for complete search history.

(56) References Cited

U.S. PATENT DOCUMENTS

2007/0060097 A1* 3/2007 Edge ................... H04L 65/1006
455/404.1
2008/0052512 A1* 2/2008 Stevens ................ H04L 63/083
713/168

(Continued)

FOREIGN PATENT DOCUMENTS

| EP | 2 824 973 A1 | 1/2015 |
| EP | 2 887 762 A1 | 6/2015 |
| WO | WO 2016/056966 A1 | 4/2016 |

OTHER PUBLICATIONS

3GPP TS 23.234 V11.0.0 (Sep. 2012), $3^{rd}$ Generation Partnership Project; Technical Specification Group Services and System Aspects; 3GPP system to Wireless Local Area Network (WLAN) interworking; System description (Release 11), section 5.2, 3 pgs.

(Continued)

*Primary Examiner* — Edan Orgad
(74) *Attorney, Agent, or Firm* — Harrington & Smith

(57) ABSTRACT

The present invention addresses a method, apparatus and computer program product for accessing a local area scoped network having non-access-stratum procedures, such as a MuLTEfire network, which implement identifying an available access point of the local area scoped network having non-access-stratum procedures, transmitting a message to the access point, indicating a request for retrieving network information, wherein the information are queried from the network before authorization and actually connecting to the (Continued)

network, selecting a service provider of the network based on received network information for binding the network identity to the selected service provider for accessing, and conveying a Non-Access Stratum service request to the network to cause authentication of the user equipment for connecting to the network.

20 Claims, 9 Drawing Sheets

(51) Int. Cl.
    *H04W 48/16*     (2009.01)
    *H04W 48/18*     (2009.01)
    *H04W 76/27*     (2018.01)
    *H04L 5/00*     (2006.01)
    *H04W 48/14*     (2009.01)
    *H04W 74/08*     (2009.01)
    *H04W 48/00*     (2009.01)
    *H04W 16/14*     (2009.01)

(52) U.S. Cl.
    CPC ........... *H04W 48/16* (2013.01); *H04W 48/18* (2013.01); *H04W 74/0808* (2013.01); *H04W 76/27* (2018.02); *H04W 16/14* (2013.01); *H04W 48/17* (2013.01)

(56) References Cited

U.S. PATENT DOCUMENTS

| | | | | |
|---|---|---|---|---|
| 2010/0290448 A1* | 11/2010 | Rune | ..................... | H04W 88/06 370/338 |
| 2012/0082098 A1* | 4/2012 | Oprescu-Surcobe | ........................ | H04L 65/00 370/329 |
| 2013/0039275 A1* | 2/2013 | Patil | ..................... | H04W 36/36 370/328 |
| 2013/0272287 A1 | 10/2013 | Xiang et al. | .................. | 370/338 |
| 2013/0322347 A1* | 12/2013 | Alex | ..................... | H04W 74/00 370/329 |
| 2014/0204927 A1 | 7/2014 | Horn et al. | .................... | 370/338 |
| 2014/0241235 A1* | 8/2014 | Speight | ................. | H04W 52/46 370/315 |
| 2015/0334615 A1* | 11/2015 | Zhang | .................. | H04W 36/04 370/331 |
| 2015/0339724 A1 | 11/2015 | Pelletier et al. | | |
| 2015/0365864 A1* | 12/2015 | Stalnacke | ............. | H04W 36/14 455/436 |

OTHER PUBLICATIONS

3GPP TS 23.234 V12.0.0 (Sep. 2014), $3^{rd}$ Generation Partnership Project; Technical Specification Group Services and System Aspects; 3GPP system to Wireless Local Area Network (WLAN) interworking; System description (Release 12), sections 5.1.1, 5.1.4, 5.4.1, 5.4.2.1.1., 5.7.1, 5.10.1, 7.1.1, 15 pgs.

3GPP TS 24.234 V11.0.0 (Sep. 2011), "31d Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)", 38 pgs.

\* cited by examiner

METHOD, APPARATUS AND COMPUTER PROGRAM PRODUCT FOR ACCESSING A LOCAL AREA SCOPED NETWORK HAVING NON-ACCESS-STRATUM PROCEDURES

This patent application is a U.S. National Stage application of International Patent Application Number PCT/EP2016/081703 filed Dec. 19, 2016, and claims priority to International Patent Application Number PCT/EP2015/080560 filed 18 Dec. 2015, each of which is hereby incorporated by reference in its entirety.

FIELD OF THE INVENTION

The present invention generally relates to wireless communication networks, and more specifically relates to a method, apparatus and computer program product for improved accessing a local area scoped network having non-access-stratum procedures, in particular a network according to the MuLTEfire technology.

BACKGROUND

Mobile data transmission and data services are constantly making progress, wherein such services provide various communication services, such as voice, video, packet data, messaging, broadcast, etc. In recent years, Long Term Evolution LTE™, and in particular LTE-Advanced™, has been specified, which uses the Evolved Universal Terrestrial Radio Access Network E-UTRAN as radio communication architecture according to 3GPP specification.

Recently, a technology initiative called MuLTEfire (MF) has been established. MF is communications system where LTE radio technology is applied to unlicensed radio band. The difference to the currently on-going Licensed Assisted Access (LAA/LTE-U) activities is that in MF there is not expected to be macro network nor licensed carriers in use, but instead MF is a standalone system designed to operate on unlicensed band frequencies.

MF can operate e.g. on the same 5 GHz band as WLAN does. Other unlicensed frequencies are available or may become available at around 3.5 GHz, at 7 GHz, at 60 GHz and/or in several high frequency bands above 6 GHz. Further unlicensed spectrum slices may be appear in low frequencies below 1 GHz. MF technology is also subject of the 'MulteFire Alliance'.

However, for local area scoped network having non-access-stratum procedures, in particular (but not restricted to) MuLTEfire systems, there is the need for providing an improved network selection.

As a related prior art in WLAN, a query protocol (Access Network Query Protocol (ANQP) [IEEE802.11u]) was specified to allow a device to retrieve information of available service Providers from a WLAN network before authentication and before association. This information obtained beforehand is crucial for the UE to decide, which network to connect to. It is typical that in dense area a large number of overlapping networks are available and a large number of Access Points to connect to, can be found. It is important to know beforehand, which Access Points belong to which networks and which services each of the networks provide. ANQP is e.g. in use for this purpose in the set of Hotspot (Passpoint) protocols.

As another distant prior art, LTE networks can let UE provide an emergency indication during initial attach request and in that case a network may provide access to the limited emergency services without authentication. However, in LTE environment in general there is no need and hence there is no solution that enables a UE to retrieve network access related information or network service information before attaching/authenticating to it.

SUMMARY OF THE INVENTION

Therefore, in order to overcome the drawbacks of the prior art, it is an object underlying the present invention to provide improved accessing a local area scoped network having non-access-stratum procedures, in particular a network according to the MuLTEfire technology.

In particular, it is an object of the present invention to provide a method, apparatus and computer program product for enhanced query of service providers in a MF network.

This object is achieved by a method, apparatus and computer program product as defined in the accompanying claims.

According to a first aspect of the present invention, there is provided method for a user equipment for accessing a local area scoped network having non-access-stratum procedures, which may be performed by a user equipment, comprising identifying an available access point of the local area scoped network having non-access-stratum procedures, transmitting a message to the access point, indicating a request for retrieving network information, wherein the information is queried from the network before authentication/authorization and actually connecting to the network, selecting a service provider of the network based on received network information for binding the network identity to the selected service provider for accessing, and further conveying a Non-Access Stratum service request to the network to cause authentication of the user equipment for connecting to the network.

According to a second aspect of the present invention, there is provided method for enabling access of a user equipment to a local area scoped network having non-access-stratum procedures, which may be performed in a network element of a MF network, comprising receiving a message from the user equipment, indicating a request for retrieving network information, wherein the information is queried from the network before actually connecting to the network, accepting the request without authentication and transmitting network access information to the user equipment, upon receiving information about a selection of a service provider by the user equipment, binding the network identity to the selected service provider for accessing, and upon receiving a Non-Access Stratum service request from the user equipment, allowing authentication of the user equipment for connecting to the network.

According to a third aspect of the present invention, there is provided an apparatus including a function for a user equipment for accessing a local area scoped network having non-access-stratum procedures, comprising at least one processor, and at least one memory for storing instructions to be executed by the processor, wherein the at least one memory and the instructions are configured to, with the at least one processor, cause the apparatus at least to perform identifying an available access point of the local area scoped network having non-access-stratum procedures, transmitting an associate request message to the access point, indicating a request for retrieving network information, wherein the information is queried from the network before authorization and actually connecting to the network, selecting a service provider of the network based on received network information for authorizing binding the network identity to the selected service provider for accessing, and further conveying a Non-Access Stratum service request to the network to cause authentication of the user equipment for connecting to the network.

According to a fourth aspect of the present invention, there is provided an apparatus including a function for enabling access of a user equipment to a local area scoped network having non-access-stratum procedures, comprising at least one processor, and at least one memory for storing instructions to be executed by the processor, wherein the at least one memory and the instructions are configured to, with the at least one processor, cause the apparatus at least to perform receiving an associate request message from the user equipment, indicating a request for retrieving network information, wherein the information is queried from the network before actually connecting to the network, accepting the associate request without authentication and transmitting network access information to the user equipment, upon receiving information about a selection of a service provider by the user equipment, binding the network identity to the selected service provider for accessing, and upon receiving a Non-Access Stratum service request from the user equipment, allowing authentication of the user equipment for connecting to the network.

According to a fifth aspect of the present invention, there is provided a computer program product comprising computer-executable components which, when the program is run, are configured to carry out the method according to the first or the second aspect.

Advantageous further developments or modifications of the aforementioned exemplary aspects of the present invention are set out in the dependent claims.

According to certain embodiments of the present invention, the local area scoped network having non-access-stratum procedures is a network according to the MuLTEfire technology.

According to certain embodiments of the present invention, the network information comprise at least one of access information, information of at least one service provider of the network, and other information, such as network metrics, in a MF network. That is, it is possible to query further information than service provider information, such as the network metrics in a MF network.

Further, according to certain embodiments of the invention, the network information is exchanged with the network in at least one of Non-Access Stratum signaling and Radio Resource Control signaling messages.

Moreover, according to certain embodiments of the present invention, the network metrics may comprise information about at least one of capabilities and performance metrics of the network Thereby, according to certain embodiments of the present invention, the metrics comprise at least one of a Physical Resource Block load, indicated for example by a percentage of Physical Resource Blocks used per sub-frame averaged over a large number of sub-frames, a Physical Resource Block peak to average ratio, indicated by the ratio of the short term peak number of Physical Resource Blocks occupied divided by the long term average Physical Resource Block usage, an average Packet Data Convergence Protocol Service Data Unit delay between the access point and the user equipment, and a Channel Quality Indicator load averaged over a specific time, indicative of the interference load in the network. Also, the used bandwidth allocations due carrier aggregation impact on the percentage of PRB load i.e. if getting one component carrier for allocations, the PRB load can be higher compared to allocating on multiple component carriers. Bandwidth and/or carrier use indication can be included to a load metric too.

Other load metrics due to unlicensed band operation can be included, either together with the mentioned ones or without them. Load can indicate free airtime percentage as free/busy time ratios over a measurement period. Listen-Before-Talk procedures, contention based access principles and collision probabilities have an impact to these measures. As said, frequency use has a large impact. There can be an opportunity for a frequency reuse 1 operation between MF-APs in the same network so that some MF-APs of the same network can simultaneously operate on the same frequency without mutual channel competition, while they compete for free channels only relative to the other 'alien' MF-APs or other transmitters, like WLANs. Therefore, channel competition can impact the other metrics like the PRB load. If MF transmitter does not get the channel, the buffers will be filled with more data in the meanwhile (queueing), which leads to a higher PRB load in the next phase. Further, once competing for the channel per component carrier, times with higher bandwidth allocation can serve high load in shorter time compared to serving the load in smaller bandwidth. This has an impact on the observed load metric, depending on its preferred calculation.

According to certain embodiments of the present invention, no bearer establishment is allowed while the user equipment is associated (but not yet ATTACHED) to the network in a limited manner during the query procedure.

Further, according to certain embodiments of the present invention, a temporary Cell Radio Network Temporary Identifier (C-RNTI) is used for signaling the allocations of radio resources needed for the query procedure. The C-RNTI is validated into the communication use after authentication and interface (bearer) setup.

Still further, an example mechanism to identify the service provider is binding the network identity to the Fully Qualified Domain Name FQDN of the selected service provider for accessing, wherein any format may be used as long as the participating entities mutually understand it or are able compare and detect matching identity.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
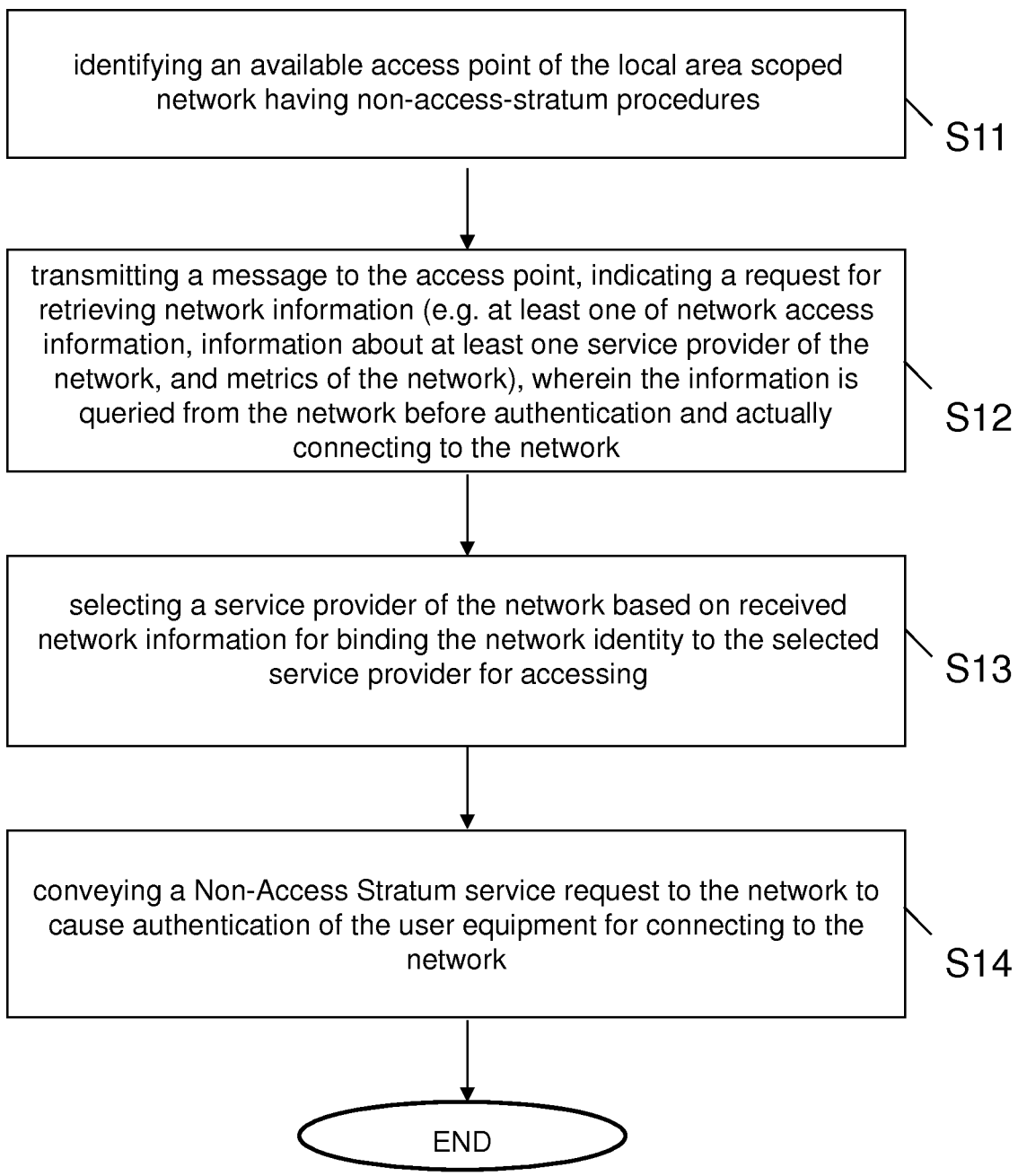
FIG. 1 illustrates a method performed in a user equipment, such as any 3GPP device category including smart phones, laptops, wearables, communicators, pads, machines and internet of things, according to certain embodiments of the invention.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refer to specifications being used as non-limiting examples for certain exemplary network configurations and deployments. Namely, the present invention and its embodiments are mainly described in relation to 3GPP as well as MuLTEfire specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE or MuLTEfire based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives. Also, the favorable execution order of features, procedures may differ in different deployments or implementations.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a wireless communication network comprises plural network elements, such as evolved NodeB's (eNB; i.e. base station in LTE/LTE-A environment), user equipments UE (e.g. mobile phone, smart phone, Computer, etc.), controllers, interfaces, etc, and in particular any equipment used in the provision of a communications service.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

As already indicated above, the present invention provides an improved network selection for local area scoped network having non-access-stratum procedures, in particular (but not restricted to) MuLTEfire systems.

Currently, on the radio interface, MF relies on LTE technology. While operation on unlicensed spectrum requires changes to the LTE technology, the design goal is to have as few modifications as possible. The LTE radio physical layer and related protocols are being modified for the unlicensed spectrum operation including Listen-Before-Talk (LBT) mechanisms for a fair channel access between systems. The currently defined LTE unlicensed access relies on control information and signaling exchanged on the licensed carrier. The licensed carrier acts as Primary carrier or Primary cell (PCell), whereas the unlicensed carrier acts as Secondary Carrier or Secondary cell (Scell). MF is expected to operate entirely on the unlicensed carriers. If MF has Primary and Secondary carriers or Primary and Secondary Cells, they are all on unlicensed spectrum. In MF, it is possible to change a Primary carrier to another carrier, or the Secondary carrier to another carrier or inter-change a Primary carrier to Secondary and vice versa.

In the MF architecture, the radio interface terminates in the UE and in the MF Access Point on the network side. For simplicity, in the following the MF Access Point is also referred to as MF-AP. As one alternative, MF-AP can be connected to a conventional core network, i.e. Evolved Packet Core (EPC). In another deployment alternative, MF-AP can be connected to a MF core network (MF CN), which realizes the minimum set of necessary core network functions for the MF operations, in a local network domain. MF CN is intended to be as simple as possible, the target is to be able to realize MF core network in one physical network equipment (SW/HW). MF core network can be realized as a virtualized implementation allowing cloud implementation. When MF network is deployed with the MF core network, the network setup may resemble WLAN deployment, however operating with 3GPP protocols. The MF CN may be called mini-EPC, as an example.

As with any other communication system, MF networks need to be identified uniquely in order the UE to select which network to connect to and which service provider to select. This has importance both in the initial network access and during mobility procedures like handover with or without crossing network boundaries. For example, 3GPP networks are identified with Public Land Mobile Network (PLMN) identities that in practice identify the (licensee) operator of the network. It is assumed that PLMN based MF network selection is possible when MF is used as LTE extension e.g. as unlicensed LTE nodes or as LTE subnets. However, MF is not limited to the LTE mode only; it has also local service provisioning, independent of PLMNs, here referred to as the local MF mode. This way, MF provides an opportunity for access operators and service providers (like Internet Service Providers, ISP), who do not have cellular licenses and who do not operate PLMNs, neither have registered/licensed PLMNI Ds.

A single MF network can be connected to multiple operators having PLMNID or alternatively to Internet Service Providers. A Service Provider in this context is any "operator" who can perform the authentication (and charging) of a user to the network. This has some similarity to how the Service Providers may use WLAN access in hotspots. In a local area scoped network having non-access-stratum (NAS) procedures, a user equipment UE should learn the available Service Providers and should know whether the preferred Service Provider is available before it attaches to the network. The UE needs to indicate to the MF network which Service Provider it would like to use for authentication. Service Provider selection also defines used CN network and it is the CN which initiates authentication.

The problem is that the number of Service Providers offering connectivity from a single access network can be high and their identities can be long. As said, the Service Providers of MF cannot be expected to be cellular network operators having a PLMNID. Rather, the Service Providers, in general, are identified by their Fully Qualified Domain Names (FQDN). For these reasons, to advertise the full identifiers of all the available Service Providers in broadcast messages is not a feasible solution. Advertising short format of the identifiers of the Service Providers might be possible, but the short format of the identifiers is not understandable for the end-users and hence manual selection is not convenient enough. Assigning short formats for FQDNs, the formats of which would be unique, may be challenging. In particular, if automatically generating short formats, their uniqueness may not easily be guaranteed.

In NAS access, the cellular network user identification used for registration (customer info) is needed in addition to getting the IP address for networking. These allow privacy, security and charging as an example.

In the following description of embodiments of the invention, the message indicating a request for retrieving network information may, as a non-limiting example, also be referred to as an 'associate request' message. This exemplary terminology expresses the purpose of e.g. associating a UE to a (MF-) network for connecting to the network.

According to certain embodiments of the invention, signaling procedures to access a MF network by the MF:NAS_Service_Request message, according to the 3GPP Non-Access Stratum NAS protocols are disclosed. The set of procedures include MF:NAS_Query, which can be used to query information from the MF network before actually connecting to the MF network and before executing the network ATTACH. These procedures are needed to avoid the accessing UE to attempt switching from the idle state to the connected state to a MF network, where no suitable PLMN or Service Provider would be available. Further the MF:NAS_Query is used by the UE to obtain network metrics from the MF network before the ATTACH attempt, to evaluate, whether the MF network is capable of well serving the UE in terms of expected network load and offered quality.

The solution according to an aspect of the invention basically comprises the following steps. At first, the UE sends a MF:Associate_Request with a new request type, which indicates that UE retrieves access information (e.g. names of available access network providers or Service Providers), before the actual MF:NAS_Service_Request will be executed. Then, the network may accept the MF:Associate_Request without authentication for exchanging a limited and defined set of network Query Information elements. The information can be exchanged un-ciphered. The network in this phase allows the UE to send only a limited set of special type of messages or Information elements in a message for the Query, and the network hence delivers the requested information. The requested information provided by the network may be an exact response to the query of the UE, or the network may append the information to a suitable length. The network may also include optional information elements to its query response. After receiving sufficient information, the UE may decide to attempt network access and will transmit the actual MF:NAS_Service_Request in the NAS message, which also terminates the Query. The NAS termination point in the network (MME similar to the legacy LTE networks, mini-EPC in MF, or MF CN) can send replies to these requests in the NAS messages or initiate other dedicated signaling with the UE.

Thereby, the UE and the network should terminate the session after a short time of query. No bearer ("eps-bearer") establishment is allowed while the UE is associated (but not yet ATTACHED) to the network in this limited manner. After the MF:NAS_Service_Request is served by the network and after the authentication is successful, the UE changes to the ATTACHED state.

The NAS service request can include an identity of a UE or a user in terms given by the Service Provider. Such identity can have a form of a bit field, a uniform resource name (urn), a temporary subscriber identity, any service provider given user identity, e.g. a number, or an identity that is valid in a given MF network.

FIG. 1 illustrates a method for accessing a user equipment to a local area scoped network having non-access-stratum procedures (e.g. MF network) performed in a user equipment according to certain embodiments of the invention.

In Step S11, an available access point of the local area scoped network having non-access-stratum procedures is identified.

In Step S12, a message, such as e.g. an associate request message MF:Associate_Request, is transmitted to the access point, indicating a request for retrieving network information (e.g. comprising at least one of information of at least one service provider of the network, network metrics and any access information), wherein the information is queried from the network before authenticating and actually connecting to the network.

Further, in Step S13, a service provider of the network is selected based on received network information for binding the network identity to (e.g. the Fully Qualified Domain Name) the selected service provider for accessing.

Then, in Step 14, a Non-Access Stratum service request MF:NAS_Service_Request is conveyed to the network to cause authentication of the user equipment for connecting to the network.

Figure 2:
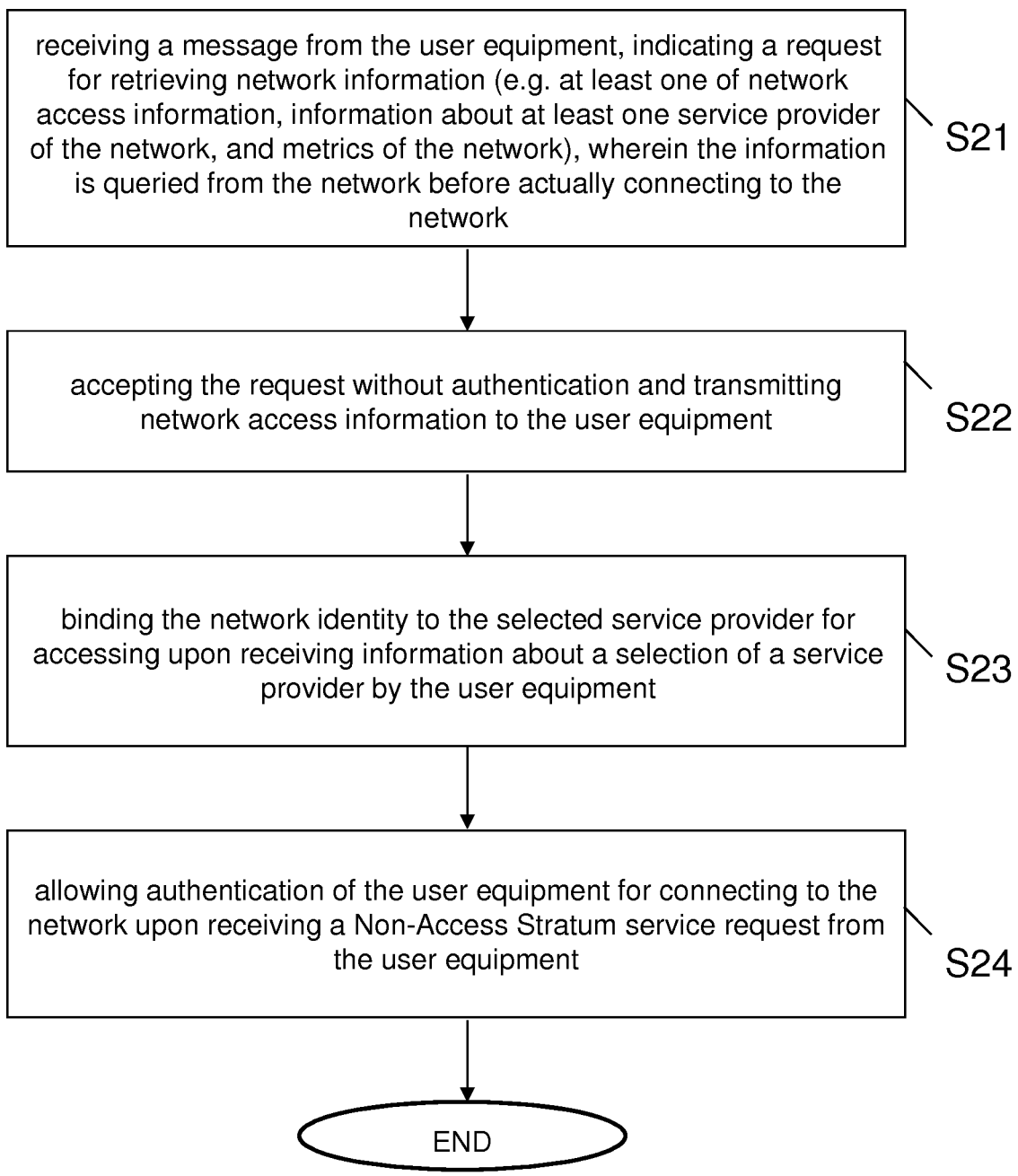
FIG. 2 illustrates a method performed in a network element of a local area scoped network having non-access-stratum procedures, in particular a network according to the MuLTEfire MF technology.

FIG. 2 illustrates a method for enabling access of a user equipment to a local area scoped network having non-access-stratum procedures (e.g. MF network) performed in a network element (e.g. of a MF network) according to certain embodiments of the invention.

In Step S21, a message, such as an associate request message MF:Associate_Request, is received from the user equipment, indicating a request for retrieving network information, information (e.g. comprising at least one of information of at least one service provider of the network, network metrics and any access information), wherein the information is queried from the network before actually connecting to the network.

In Step S22, the (associate) request is accepted without authentication and transmitting network access information to the user equipment.

Further, in Step S23, upon receiving information about a selection of a service provider by the user equipment, the network identity is bound to the (e.g. Fully Qualified Domain Name of) the selected service provider for accessing.

Then, in Step 24, upon receiving a Non-Access Stratum service request, MF:NAS_Service_Request from the user equipment, authentication of the user equipment for connecting to the network is allowed.

Figure 3:
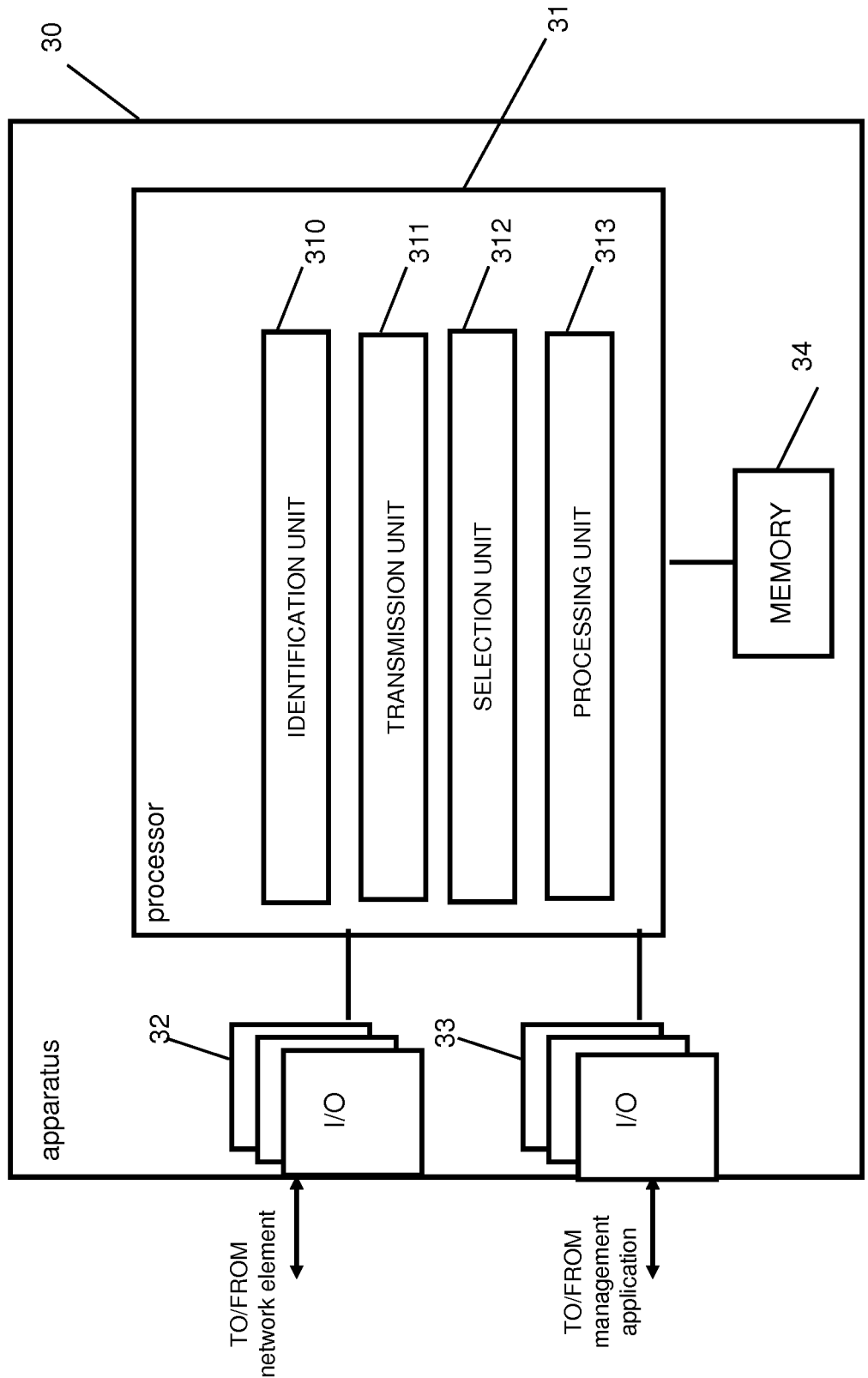
FIG. 3 depicts a general structure of an apparatus comprised in a user equipment, including a function for accessing the user equipment to a local area scoped network having non-access-stratum procedures (e.g. MF network)

In FIG. 3, a diagram illustrating a configuration of an element comprised in a user equipment implementing a function for accessing a user equipment to a local area scoped network having non-access-stratum procedures (e.g. MF network) according to some example versions of the disclosure is shown. The embodiment may be carried out in or by the user equipment. It is to be noted that the user equipment may comprise elements or functions, such as a chipset, a chip, a module etc., which can also be part of the user equipment or attached as a separate element to the user equipment, or the like. It should be understood that each block and any combination thereof may be implemented by various means or their combinations, such as hardware, software, firmware, one or more processors and/or circuitry.

The apparatus 3 shown in FIG. 3 may comprise a processing function, control unit or processor 31 such as a CPU or the like, which is suitable for executing instructions given by programs or the like related to the network element control procedure.

The processor 31 is configured to execute processing related to the above described access to a local area scoped network having non-access-stratum procedures (e.g. MF network). In particular, the processor 31 comprises a sub-portion 310 as an identification unit configured to identify an available access point of the local area scoped network having non-access-stratum procedures. The portion 310 may be configured to perform processing according to S11 of FIG. 1. Furthermore, the processor 31 comprises a sub-portion 310 usable as a transmission unit configured to transmit a message to the access point, indicating a request for retrieving network information, wherein the information is queried from the network before authentication and actually connecting to the network. The portion 311 may be configured to perform processing according to S12 of FIG. 1. Still further, the processor 31 comprises a sub-portion 312 usable as a selection unit configured to select a service provider of the network based on received network information for binding the network identity to the selected service provider for accessing. The portion 312 may be configured to perform processing according to S13 of FIG. 1. Moreover, the processor 31 comprises a sub-portion 313 usable as a processing unit configured to conveying a Non-Access Stratum service request to the network to cause authentication of the user equipment for connecting to the network. The portion 313 may be configured to perform processing according to S14 of FIG. 1.

Figure 4:
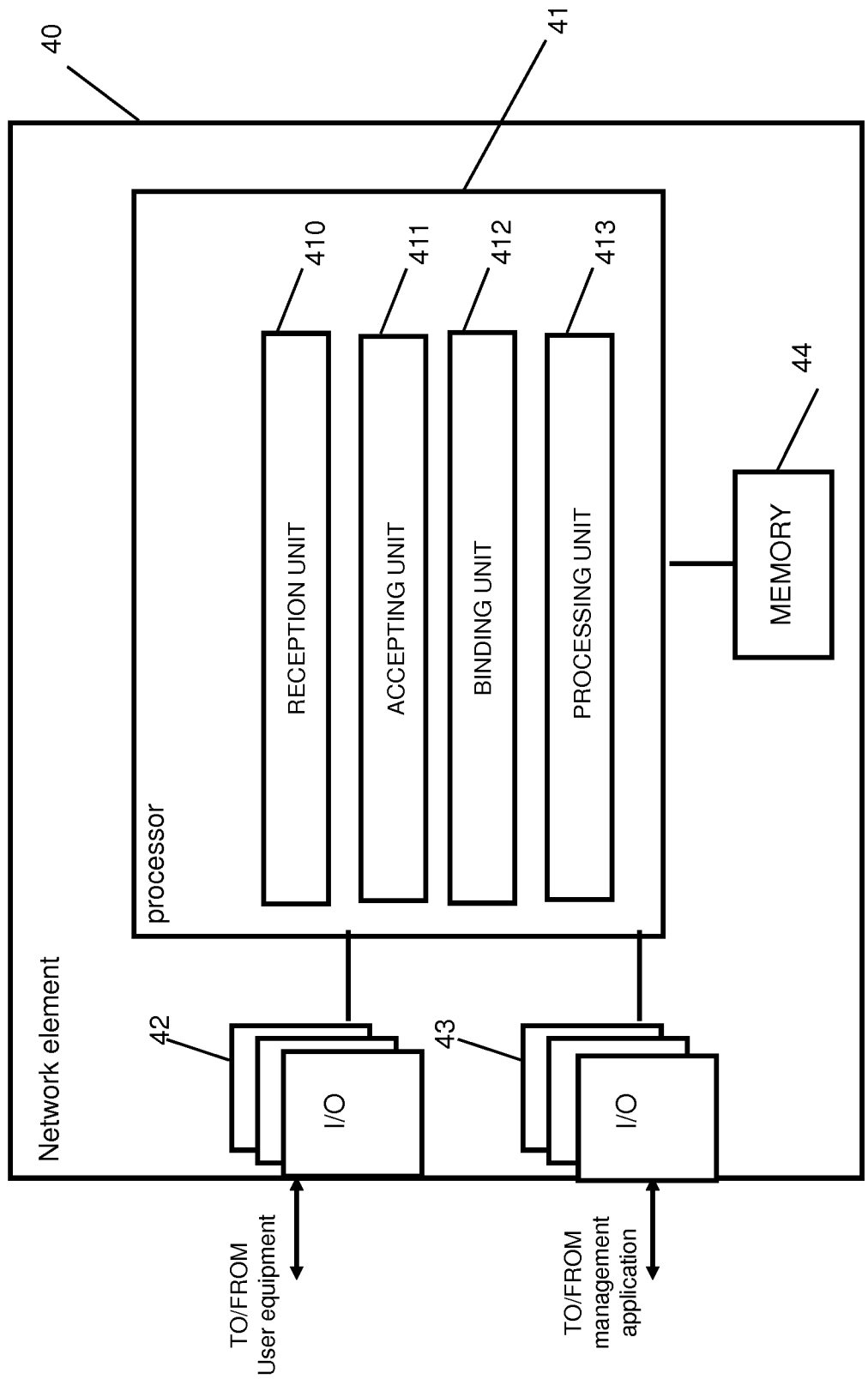
FIG. 4 depicts a block diagram of an apparatus comprised in a network element, including a function for enabling access of a user equipment to a local area scoped network having non-access-stratum procedures (e.g. MF network)

FIG. 4 depicts a block diagram of an apparatus comprised in a network element, including a function for enabling access of a user equipment to a local area scoped network having non-access-stratum procedures (e.g. MF network). It should be understood that each block and any combination thereof may be implemented by various means or their combinations, such as hardware, software, firmware, one or more processors and/or circuitry.

The network element 4 shown in FIG. 4 may comprise a processing function, control unit or processor 41 such as a CPU or the like, which is suitable for executing instructions given by programs or the like related to the network element control procedure.

The processor 41 is configured to execute processing related to the above described access to a local area scoped network having non-access-stratum procedures (e.g. MF network). In particular, the processor 41 comprises a sub-portion 410 as a reception unit configured to receive a message from the user equipment, indicating a request for retrieving network information, wherein the information is queried from the network before actually connecting to the network. The portion 410 may be configured to perform processing according to S21 of FIG. 2. Furthermore, the processor 41 comprises a sub-portion 411 usable as an accepting unit configured to accepting the request without authentication and transmitting network access information to the user equipment. The portion 411 may be configured to perform processing according to S22 of FIG. 2. The portion 410 may be configured to perform processing according to S21 of FIG. 2. Furthermore, the processor 41 comprises a sub-portion 412 usable as binding unit configured to bind, upon receiving information about a selection of a service provider by the user equipment, the network identity to the selected service provider for accessing. The portion 412 may be configured to perform processing according to S23 of FIG. 2. Still further, the processor 41 comprises a sub-portion 413 usable as processing unit configured to, upon receiving a Non-Access Stratum service request from the user equipment, allow authentication of the user equipment for connecting to the network. The portion 413 may be configured to perform processing according to S24 of FIG. 2.

In FIGS. 3 and 4, reference signs 32, 42 and 33, 43 denote transceiver or input/output (I/O) units (interfaces) connected to the processor 31, 41. The I/O units 32, 42 may be used for communication with the elements. The I/O units 33, 43 may be used for communicating with a management application. Reference sign 34, 44 denotes a memory usable, for example, for storing data and programs to be executed by the processor 31, 41 and/or as a working storage of the processor 31, 41.

Figure 5:
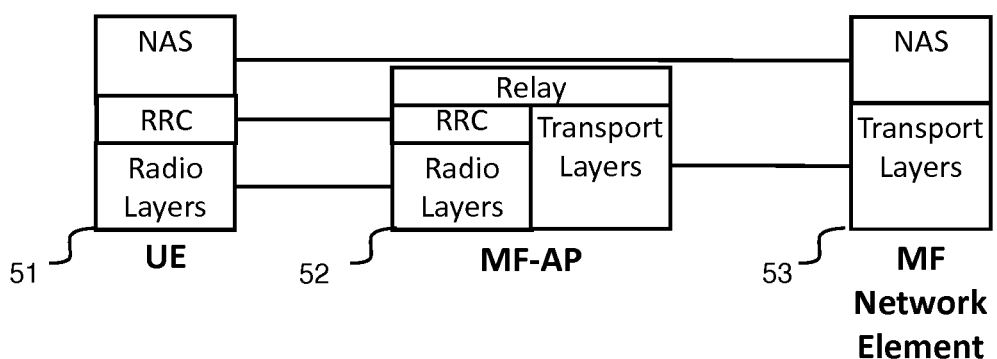
FIG. 5 schematically shows a protocol stack according to certain embodiments of the invention.

FIG. 5 schematically shows a protocol stack according to certain embodiments of the invention. An UE 51 is connected to a MF network element 53 via a MF-AP 52. The UE 51 comprises layers, such as radio layers, Radio Resource Control RRC and Non-Access Stratum NAS, whereas the MF network element 53 comprises transport layers and Non-Access Stratum NAS.

The new messages are transferred between the UE and MF Network Element in NAS signaling. They are transparent to MF-AP 52, and it is possible to apply encryption to provide some level of security (e.g. privacy). Note that this does not mean that the UE 51 and the network authenticate each-other yet.

Figure 6:
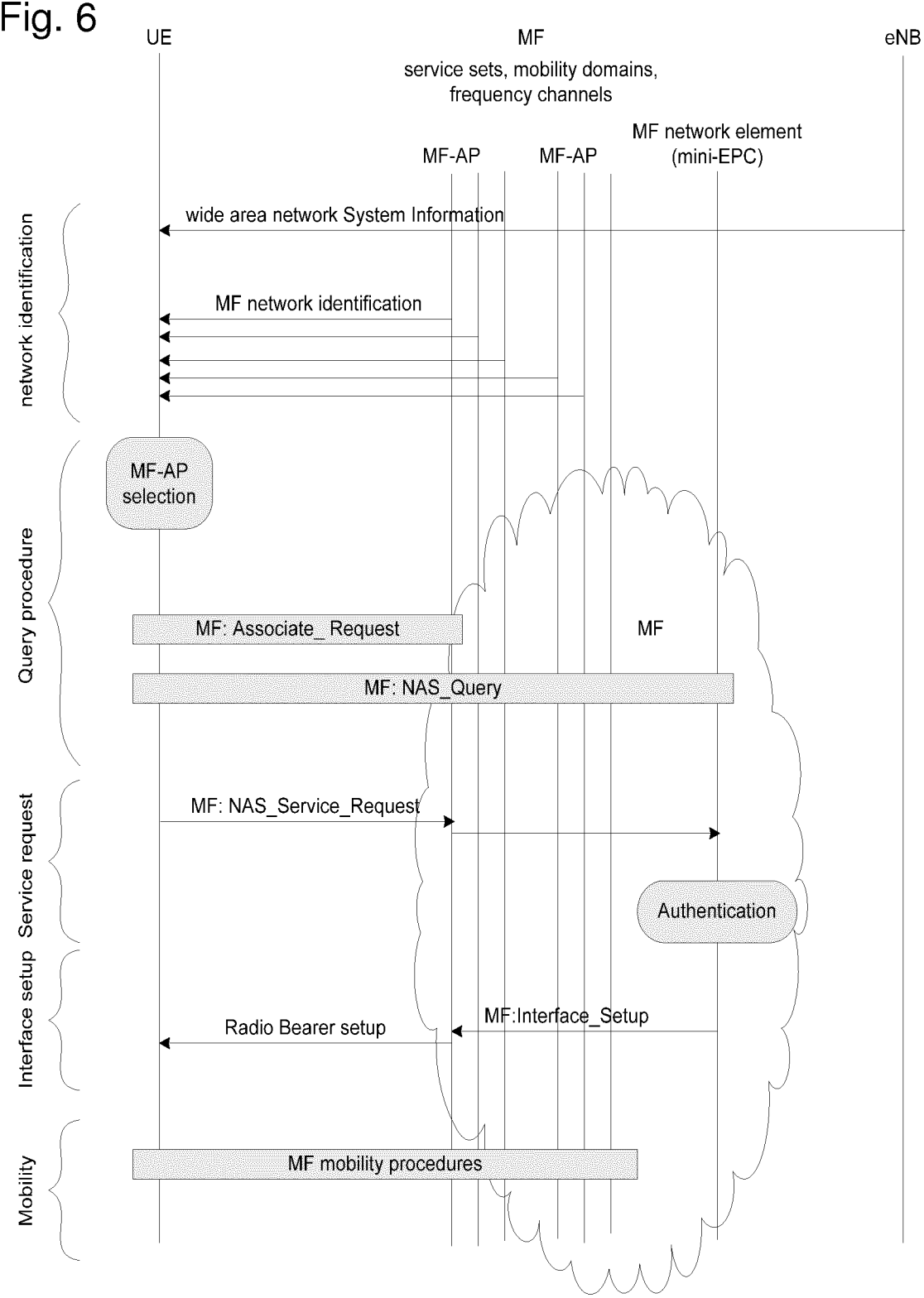
FIG. 6 is an example of Non-Access Stratum NAS procedures with query in a MF network.

FIG. 6 is an example of Non-Access Stratum NAS procedures with query in a MF network. The phases include 1) network identification, 2) query, 3) service request, 4) interface setup and 5) mobility.

The network identification includes a network-type equal to MF and network identity, which has a defined relationship to the service provider. The relationship of MF identity to the service provider identity may be a HASH function, or MF identity can be a given identity for a given service provider (e.g. assigned by some organization).

NAS associate request, MF:NAS_Associate_Request, may be quite a minimized procedure as follows; after the UE has selected a MF-AP based on signal measurements and based on its advertised MF identity to communicate with, the MF-AP uses a temporary-cRNTI (Cell Radio Network Temporary Identifier) for signaling the allocations of radio resources for the query phase. The actual c-RNTI can later be assigned for use during and after the radio bearer setup. As a novelty, c-RNTI can identify the UE operational in a MF network, despite of whether the UE's full identity is granted by the cellular operator or by a service provider.

The query phase includes binding of the MF network identity to the service provider. The MF network identity can indicate the access network provider, which can be the same as the Service Provider or it can be different from the Service Provider. A single access provider can provide access network for multiple Service providers. After the service provider is selected accordingly, UE may move in the MF network by selecting cells, which have the correct MF identity and omitting cells, whose MF identity does not match. In this selection, further query is not needed, because the MF network identity is sufficient to ensure the initially queried information is valid and the same Service Provider is reachable. This binding covers at least all the following; the access network provider is the same as the Service Provider, the access network provider is different from the Service Provider, the access network provider provides multiple, a list of, Service Providers.

In addition to finding the service provider, UE may find further information about at least one of the capabilities and performance metrics of the MF network or a network segment. This way, the UE may already in an early phase, before authentication, decide whether it will try to access this MF network or not.

In FIG. 6, the interface setup. MF:Interface_Setup is actually a procedure which will create the necessary logical interfaces in the MF network, and it will result in radio bearer setup between the MF-AP and the UE, and it will hence create the interface between the UE and the network. The "interface" between the UE and the MF network can be an IP address.

Hence the process illustrated in FIG. 6 may actually consist of more than one elementary procedures. It is noteworthy that the "interface" in FIG. 6 is not drawn to the UE even if it actually creates the interface for a UE in the network. That is what happens according to the invention in the radio bearer setup i.e. the NAS level interface is established on top of establishing the radio bearer. The "interface" is a logical higher layer interface, which may be an IP address, a network interface identifier, an access service set identifier or it may be a conception of a bearer, similar to eps-bearer, for example. In an embodiment according to what is described above, a bearer may not need to exist if the interface is functional by some other logical relationship between the network elements.

After the interface setup as well as the bearer setup, mobility in the MF network is provided by a forward type of handover, but as well a backward type of handover could be provided at least for a robust backup solution. Further, re-establishment procedures to a new target cell can be executed, because context fetch from any source cell can be expected to be fast and executed easily inside a MF network domain.

In another embodiment of the invention, the query procedure may be executed as a set of Radio Resource Control (RRC) messages, instead of, or in addition to the NAS-messages. NAS-message, in here, is any message which is exchanged between the UE and the core network entity (MF CN) with or without MF-AP involvement. RRC-procedure can be used for fetching information available in the MF-AP, such as the metric information. It is possible that some metric information has to be fetched from a more distant network element for example from the mini-EPC or from a server. Service Provider information would require fetching from the MF CN. NAS-procedures can be operational between the UE and the MF CN, hence the procedure called MF:NAS_Query can mean a procedure, which executes for the NAS access, either in the RRC-procedure, in the NAS-procedure or in combination thereof. So, the said MF:NAS_Query is a procedure operating for the NAS, despite of the actual procedural layers it is implemented into.

Generally, NAS access is the concept of the set of non-access stratum signaling procedures, i.e. the means how UE connects to and ATTACH to the core network element in the MF network. NAS access is clearly different from WLAN, which is not a cellular network but rather WLAN is an extension of the Ethernet. WLAN works with its permanent device Ethernet MAC-address and acts as the first/last few tens of meters of the Ethernet. NAS concretely defines that MF is a 3GPP compatible network in its procedures.

In MF NAS network, the UE identification can be linked to the PLMN's registry as the home subscription (or to a visited subscription) or to a service provider registry such as to a uniform resource name (urn). Such urn could be obtained e.g. by a registration into a web-page.

As described herein, according to the invention, the MF:NAS_Query procedure can be used to retrieve network metrics from the LTE based unlicensed MF network. Some example metrics are given below.

PRB Load:

Percentage of Physical Resource Blocks (PRB) used per sub-frame averaged over a large number of sub-frames. For example, PRB load 5% vs PRB load 60% could show a clear difference in the MF network loading in terms of its average resource usage. This metric can be queried per cell or per MF network. When the metric is queried per MF network, the metric is returned as averaged over all the cells of the MF network (or a subnet). There may be notable differences in load in different cells in the MF area.

PRB Peak to Average Ratio:

The ratio of the short term peak number of PRBs occupied divided by the long term average PRB usage. For example, this ratio could be 20% or 500%, which could show that the PRB resource use is very peaky. For example for the 20% average PRB load the peak of 20% could consume 24% of PRBs whereas the peak of 500% could consume 100% of PRBs respectively. The time unit for the peak calculation can be set to a value from a single sub-frame to a defined number of sub-frames smaller than the averaging period.

Delay:

Average Packet Data Convergence Protocol (PDCP) Service Data Unit (SDU) delay (round-trip-time) between the MF-AP and the UE or between the gateway and the UE depending on the definition. This metric can be averaged over the (population) of served UE and differentiated per QoS class i.e. the delay can be given per QoS Class Identifier (QCI). Note, the PDCP SDU can typically be for example an IP packet. An IP packet could for example carry a Transmission Control Protocol (TCP) segment or a unit of the User Datagram Protocol (UDP).

CQI Load:

Channel Quality Indicator (CQI) metric can be averaged over a long time. CQI is a measure of signal to interference ratio. MF-AP knows this from its served UE's reports, and it is indicative of the interference load in the cell or in the MF network. This metric can be queried per cell or per MF network (or a subnet). When the metric is queried per MF network, the metric is returned as averaged over several UE reports (of link quality) in all the cells of the MF network. There may still be notable differences in CQI loading in different cells in the MF area. Also, the UEs in a single cell may report largely different CQI load due to their location in the cell area. It is also possible that the UE observations are very heterogeneous i.e. the UE reported CQIs are observed from some locations (dense) more than from other locations (spare). The eNB can include to a CQI load metric a set or a subset of CQI observations from a set or a subset of UEs, the observations of which it considers relevant for the metric.

Figure 7A:
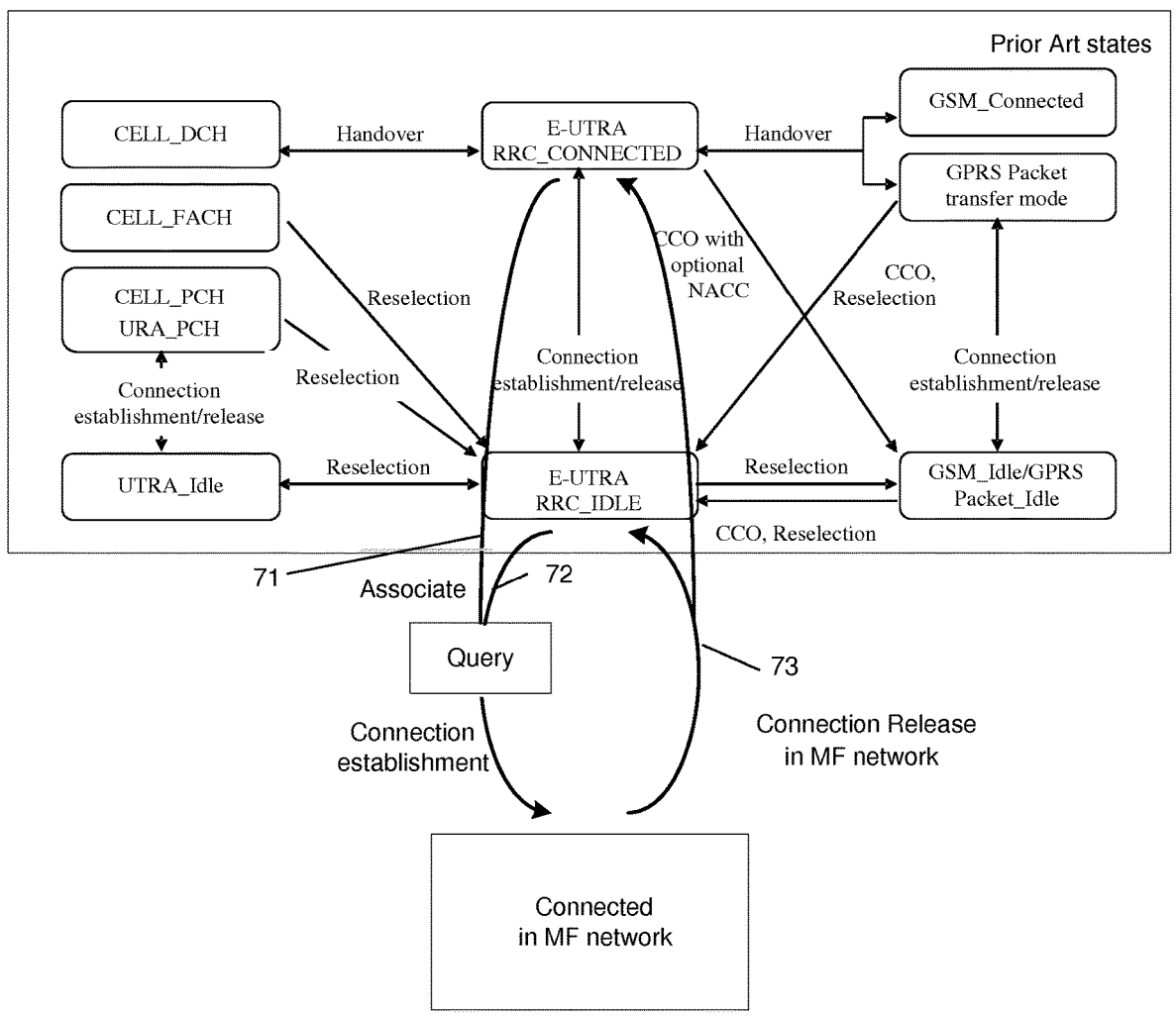
FIGS. 7*a* and 7*b* schematically show state diagrams of a user equipment in a MF network, wherein a combination of 3GPP states and MF states are shown in FIG. 7*a*, and standalone MF states are shown in FIG. 7*b*.
Figure 7B:
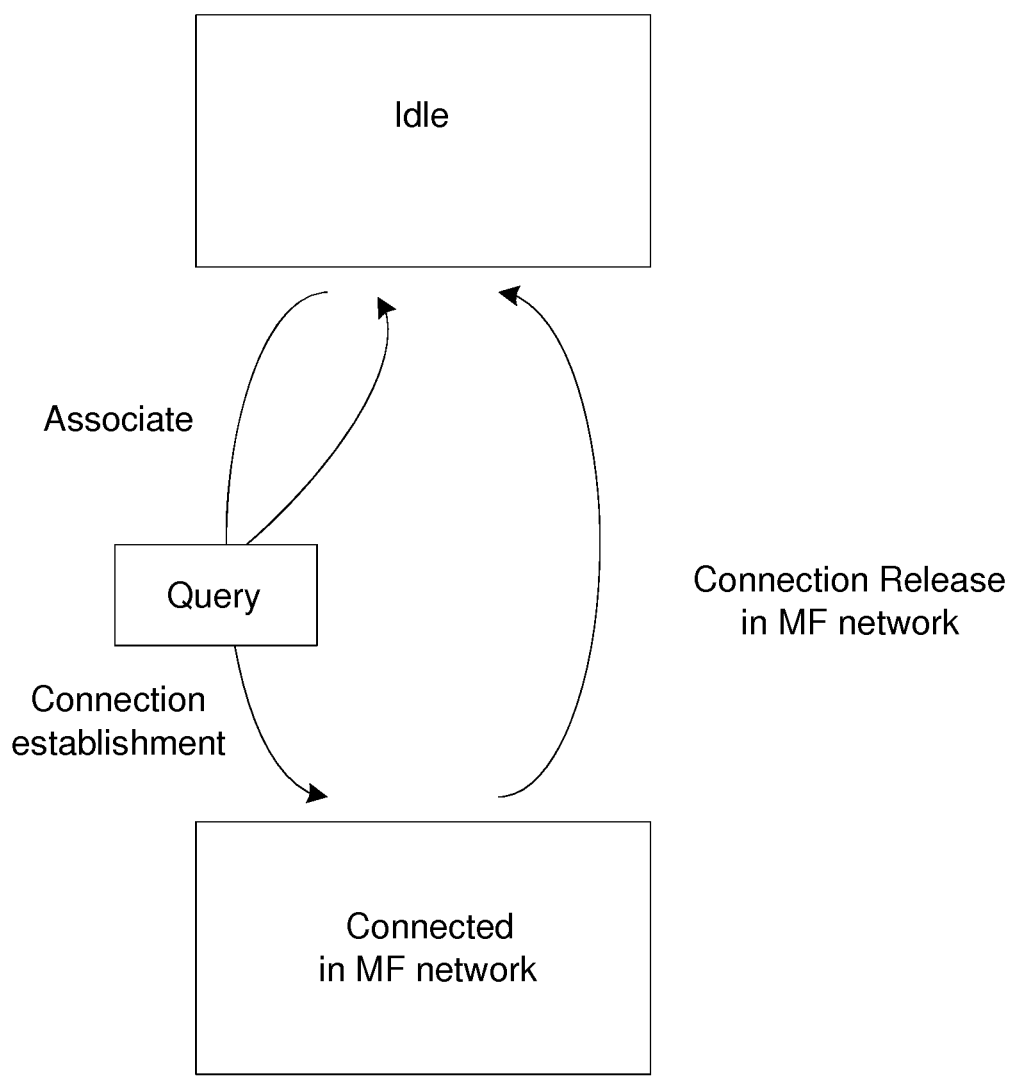

FIG. 7 shows the state diagrams of a UE in a MF network. MF network states can appear as concurrent to the 3GPP state(s) or the states can be standalone (without other 3GPP networks). The compound 3GPP states and MF states are shown in FIG. 7a, and the standalone MF states are shown in FIG. 7b.

In both cases, the UE state in a MF network is independent of its state(s) in the 3GPP networks. Hence, any state in the 3GPP network may lead to the MF connected state. Reference sign 71 in FIG. 7a shows the UE in E-UTRA (LTE) RRC Connected state making a MF Query and possibly entering to the MF connected state. Reference sign 72 shows the MF state transition while UE being in the E-UTRA (LTE) RRC Idle state.

In the MF, despite of the state in the 3GPP network, the associate is done first without a state transition. While associated, the UE may make Query according to the embodiments of the invention, whether to get connected to a MF network or not. If the UE decides, based on the Query, not to attempt connection to a MF network, the UE will remain in the original state, from where it can make an association to another candidate MF network and execute Query for that. If UE in any of these associations get favorable Query response, the UE can decide to attempt connecting to the selected MF network. In case the following NAS-procedure is successful, the UE can reach connected state in the selected MF network. It is also possible that the NAS procedure will lead to a failure e.g. due to authentication error despite of UE selecting a feasible Service Provider, which will cause the UE not to reach the MF connected state but return to the original state. Once if reaching the MF connected state, it is possible that later the UE from its own initiative or from the MF network initiative will be released from the MF network. This is shown by reference sign 73 in FIG. 7a.

The Query phase is shown in FIG. 7a as a pass-through box, which indicates that the Query does not form a UE state of its own but is rather an intermediate functionality, for information Query according to the invention, which lets the UE decide to terminate the Query either to the original state or to the NAS service request attempt towards the MF connected state, ending to the MF connected state or to a failure return to the original state. However, yet an alternative embodiment can be envisioned, where a Query happens in a clearly defined state of its own.

In FIG. 7b, an UE is shown with the standalone MF states. The operation is similar to FIG. 7a in respect to the MF network without any concurrent aspect of the 3GPP network. Hence UE in idle state may decide to associate to a MF-AP and do Query according to the invention. If the UE decides, based on the Query, not to attempt connection to a MF network, the UE will remain in the original state, from where it can make an association to another candidate MF network and execute Query for that. If UE in any of these associations get favorable Query response, the UE can decide to attempt connecting to the selected MF network. In case the following NAS-procedure is successful, the UE can reach connected state in the selected MF network. It is also possible that the NAS procedure will lead to a failure e.g. due to authentication error despite of UE selecting a feasible Service Provider, which will cause the UE not to reach the MF connected state but return to the original state. Once if reaching the MF connected state, it is possible that later the UE from its own initiative or from the MF network initiative will be released from the MF network. This is shown by reference sign 74 in FIG. 7b.

Again, the Query phase is shown in FIG. 7 as a pass-through box, which indicates that the Query does not form a UE state of its own but is rather an intermediate functionality, for information Query according to the invention, which lets the UE decide to terminate the Query either to the original state or to the NAS service request attempt towards the MF connected state, ending to the MF connected state or to a failure return to the original state. However, yet an alternative embodiment can be envisioned, where a Query happens in a clearly defined state of its own.

A special use case of a NAS procedure as illustrated in FIG. 6 is the access procedure to a MF network with service provider query. A MF radio access network (MF-RAN) may be connected to the core network of a mobile network operator (MNO), such as the 3GPP evolved packet core network (EPC), and may therefore provide basically conventional access to a mobile network, often referred to as PLMN access mode in MF. Alternatively or additionally, the MF-RAN may be operated in a mode, often referred to as neutral host network (NHN) in MF, supporting access to multiple participating service providers (PSP). A UE accessing a NHN shall be able to retrieve information about the service providers, which offer authentication and connectivity via the MF network. One MF network may support multiple PSPs, from which the UE may select a preferred PSP during initial access to the network.

System information (SI) provided in a MF cell may include a list of available PSPs, which may be identified by their names, similar to domain names, to a user. These full names may typically be too long for costly transmission in SI, since SI resources are scarce in a cell and information elements of the SI need to be transmitted periodically with full-coverage power. Further, operation in unlicensed spectrum may require the execution of a listen-before-talk (LBT) procedure before each transmission burst related to SI. Therefore, one may consider broadcasting of short PSP-IDs in SI instead of the full PSP names, and one may further consider to broadcast in SI only information related to a subset of the available PSPs, for example the most requested PSPs in a cell or network area. Therefore, an additional mechanism is needed which allows a UE in a cell to retrieve thorough information of PSPs associated with PSP-IDs broadcast in SI, for example, a list of unique identifiers such as full names of PSPs available in the cell. This mechanism may provide a list comprising full names, of arbitrary length for an arbitrary number of PSPs. The list may be provided in a message or information element with predetermined or preconfigured maximum length.

The full names or unique identifiers of the PSPs may be provided in a NAS procedure comprising a respective query. The NAS procedure may be executed based on certain enhancements of signaling procedures specified in LTE for use in a LTE-based MF network providing access to non-MNO service providers in unlicensed spectrum. The steps of the NAS procedure related to the service provider query may be executed in an LTE-based MF network for a UE entering RRC connected state without triggering or requesting the NAS attach procedure in LTE, i.e. without triggering EPS bearer setup and/or setup of interfaces for user data transmission.

Figure 8:
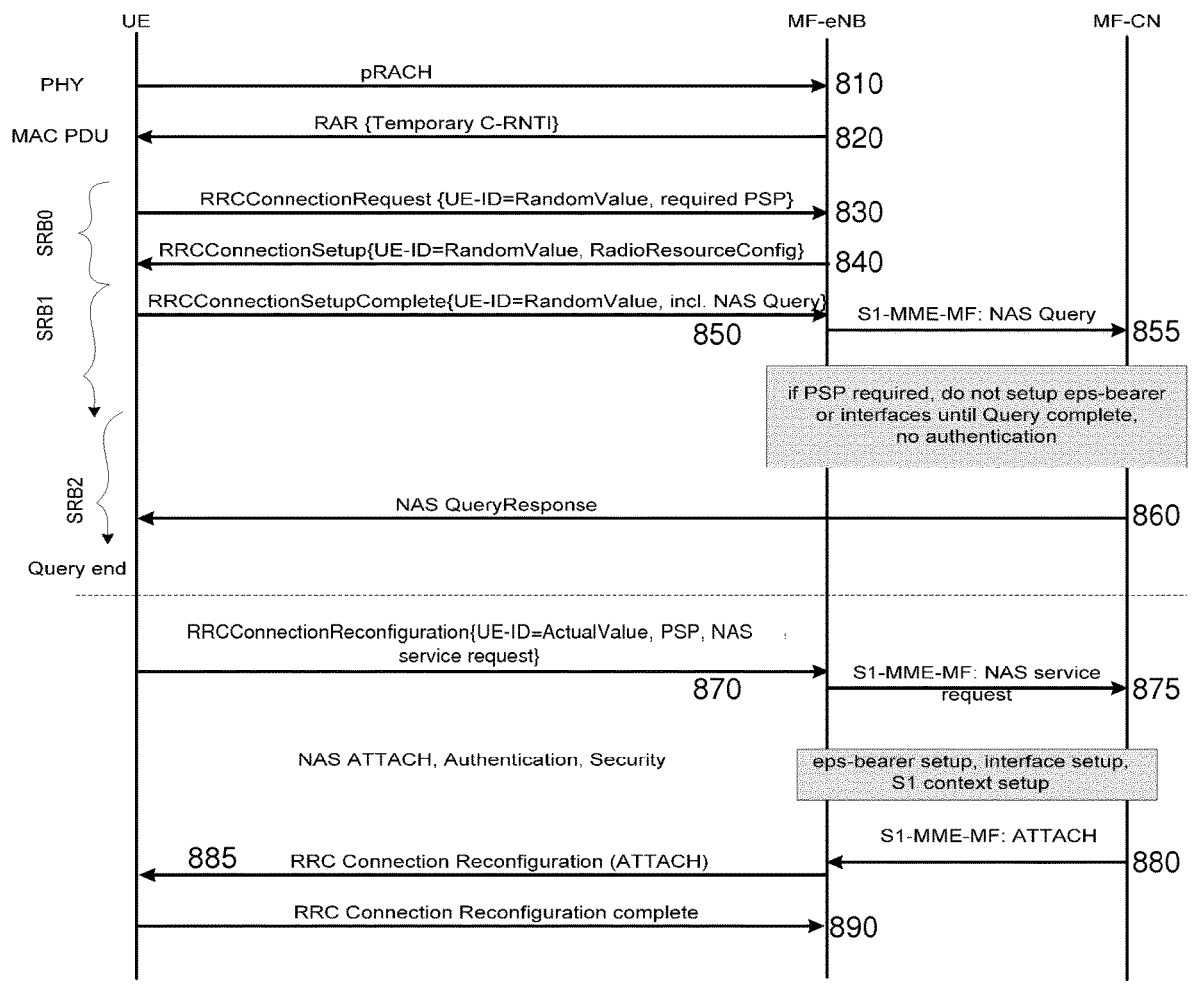
FIG. 8 shows an example of a NAS procedure for access to a MF network comprising a query for identification of Participating Service Providers (PSP).

FIG. 8 shows a signaling diagram of a procedure comprising a NAS service provider query in a LTE-based MF network. A UE may trigger the NAS service provider query when information on available PSPs in a cell is not sufficient for the UE. The SI in the cell may, for example, not include information on PSPs, or may only include a subset of the available PSPs or may only include short PSP-IDs when the UE needs unique identifiers of the PSPs, such as full names. The UE may also trigger the NAS service provider query when it refrains, for some reason, from reading PSP-related information in the SI.

Steps related to the network identification and MF-AP selection, as shown in FIG. 6, have been omitted in FIG. 8. The "MF: Associate Request" in FIG. 6 may comprise a random access attempt to a MF cell meeting the cell selection criterion. For example, in an LTE-based network the random access procedure may comprise the transmission of a first message (Msg1) in step 810 from the UE on a physical random access channel (PRACH) suitable for operation in unlicensed spectrum. Specifically, the UE may transmit a random access preamble on PRACH in step 810 after reading the cell's random access configuration from SI.

In step 820, the MF-AP may detect the random access preamble sent through the PRACH. The MF-AP may then send a second message (Msg2) known as random access response (RAR) to the UE. The RAR may in particular comprise a scheduling grant, indicating initial resources for UL transmission in the next step of the procedure and a temporary C-RNTI (cell radio-network temporary identifier) . The UE may determine the RAR destined to it based on the RA-RNTI (random access radio network temporary identifier) used on a scheduling control channel, such as the PDCCH (physical downlink control channel) in an LTE-based network. The RA-RNTI in turn may be associated with the PRACH resources used for transmission of the random access preamble in step 810.

Using the initial resources the UE may send a third message (Msg3) in step 830 comprising control information indicating a request for a query related to a MF network, for example a service provider query in a MF cell. The message may be provided using a preconfigured or predetermined bearer and channel configuration. For example, in an LTE-based network the message may be provided using signaling radio bearer 0 (SRB0) on the Common Control Channel (CCCH). The radio link control (RLC) layer in such a network may be configured for data transmission in transparent mode (TM). In an embodiment the UE may use a message similar to the RRCConnectionRequest message in LTE including a cause information, for example "required PSP", for indicating a respective query request to the network. The requesting UE may be identified to the MF network through a UE-ID set to a random value, since the UE has not yet selected a PSP, so that the UE does not know which registered UE-ID it should use.

In step 840 the MF-AP may use said preconfigured or predetermined bearer and channel configuration and respond to the message received in step 830. The message in step 840 may comprise a first specific bearer and channel configuration, similar to SRB1 in LTE, for further transmission of control information on the Dedicated Control Channel (DDCH). The first specific bearer and channel configuration may be used for transmission of control information related to the access stratum (AS), i.e. the protocols and parts of the network being specific to the access technique. The first specific bearer and channel configuration may further be used for transmission of control information related to the non-access stratum (NAS), i.e. protocols between a UE and the core network which are not terminated in the RAN, until a second specific bearer and channel configuration, similar to SRB2 in LTE, for control information related to the NAS has been established. The temporary C-RNTI may become the C-RNTI after detection of the message in step 840 at the UE, and may be used at the physical interface to identify data transmissions to the UE. Higher layers may still use the UE-ID set to a random value from step 830 for identifying the UE to the MF network. In an embodiment the MF-AP may use in step 840 a message similar to the RRCConnectionSetup message in LTE.

In step 850 the UE may respond to the message received in step 840. The message in step 850 triggers a NAS query related to the MF network. The NAS query request and the type of the query may be indicated through a respective information element "NAS Query" in the message of step 850, or may be derived from the cause information transmitted in step 830. Alternatively, an information element "NAS Query" may only indicate the query request as such, and the MF network may derive the type of the query, for example a PSP query request, from the cause information transmitted in step 830. The message in step 850 may be transmitted using the first specific bearer and channel configuration. The message in step 850 may further include information needed for establishing the second specific bearer and channel configuration for transmission of control information related to the NAS. In an embodiment the UE may use in step 850 a message similar to the RRCConnectioSetupComplete message in LTE. However, the message in step 850 may not contain an attach request, unlike the conventional RRCConnectionSetupComplete message in LTE, and will therefore not cause establishment of a transport mechanism for user data between the UE and the MF-CN. In other words, the message in step 850 may not connect the UE to the MF-CN by a user data transport mechanism similar to the EPS bearer in LTE, which specifies the route and certain quality of service parameters for the transmission of user data between the UE and the MF-CN. The message in step 850 may, therefore, not cause configuration of respective interfaces, for example interfaces similar to the S1 u-plane in LTE, for user data transmission. The message may further not cause authentication of the UE and the MF-CN to each other.

In step 855 the MF-AP may provide information related to the NAS query in the message of step 850 to the MF-CN.

In step 860 the MF-CN may respond to the NAS query. The second specific bearer and channel configuration may be used for transmitting the response to the NAS query. The same random UE-ID may be used in the NAS query and in the response to the NAS query for identifying the requesting UE. The response may be transmitted in a NAS message comprising an identifier indicative of the included NAS query response and potentially the type of the NAS query. In case of a NAS service provider query, the response may comprise a PSP list. This PSP list may include unique PSP identifiers, such as PSP full names, sometimes referred to as PSP-IDs in the long format. The PSP identifiers may be of variable length and the PSP list may include any number of PSP identifiers. The NAS message carrying the NAS query response may be segmented by the RLC in the MF-AP. The RLC in the MF-AP may be configured to operate in acknowledged mode (RLC-AM) or unacknowledged mode (RLC-UM). The transport of the NAS query response from the MF-AP to the UE may reuse transport mechanisms established for the transmission of AS related control information, such as RRC messages in LTE. The NAS message carrying the NAS query response may be transmitted using the first or the second specific bearer and channel configuration. The second specific bearer and channel configuration, similar to SRB 2 in LTE, may be preferred in the case of long NAS query responses. The MF-AP may set up a respective radio resource configuration and respective protocol entities for transmission of the NAS query response. The MF-AP may in particular configure radio resources for the transmission of uplink control information, similar to the physical uplink control channel (PUCCH) in LTE.

A UE executing the NAS query procedure in FIG. 8 is only known to the MF-CN by its random UE-ID after step 860. After receiving the NAS query response the UE may decide to access the MF network, for example, if the NAS query response indicates the availability of a suitable or preferred PSP in a MF cell. For accessing the MF network the UE may transmit a message comprising a NAS service request, as shown in step 870 in FIG. 8. The message in step 870 may identify the selected PSP and may further include the UE-ID under which the UE is registered at the selected PSP. With transport mechanisms for control information such as the first and the second specific bearer and channel configuration already being established, the message of step 870 may cause a reconfiguration of the connection between the UE and the MF-CN. Specifically, the message may cause establishment of a transport mechanism for user data between the UE and the MF-CN, similar to the EPS bearer in LTE. Accordingly, the message may cause configuration of respective interfaces for user data transmission, similar to the S1 u-plane in LTE. The message may further cause authentication of the UE and the MF-CN to each other. In an embodiment the UE may use in step 870 a message similar to the RRCConnectionReconfiguration message, but with cause information "NAS service request" and the selected PSP.

In step 875 the MF-AP may provide information related to the NAS service request in the NAS message of step 870 to the MF-CN. This NAS message may cause the MF-CN to perform all steps needed on the side of the MF-CN for user data transmission between the UE and the MF-CN, such as establishing a respective transport mechanism and related interfaces, and authentication.

The MF-CN may confirm the NAS service request from the UE in the NAS message in step 880. The message may include information for attachment of the UE to the MF-CN, for example information related to the established transport mechanism for user data transmission.

In step 885 the MF-AP may provide information needed for attachment of the UE received in step 880 to the UE.

In step 890 the UE may confirm attachment of the UE to the MF network for service access to the PSP. The message may comprise reconfiguration information related to the transport mechanism for user data transmission between the UE and the PSP.

In case the UE decides after reception of the NAS query response in step 860 not to access the MF network, the UE may trigger a connection release operation by sending a respective request to the MF network. The MF network may then remove all UE context information related to the random UE-ID from the MF network. In an embodiment the connection release procedure may comprise the transmission of connection release message to the UE, similar to the RRCConnectionRelease message in LTE.

Such an explicit release signaling and the related handshake mechanism require time, radio and network resources for maintaining the UE in a MF cell even though the UE has decided not to use the MF cell for access to the MF network. Further, the connection release procedure using explicit signaling may not always work reliably, and the UE may, from the perspective of the MF-AP and the MF-CN, simply disappear after the transmission of the NAS query response. Therefore, the MF-AP and/or the MF-CN may maintain a timer. This timer may for example be started after delivery of the NAS query response. Upon expiry of the timer, the MF network may start a connection release procedure, and the MF network may remove all UE context information related to the random UE-ID from the MF network. The MF-AP may inform the UE about the connection release procedure. In case the connection release procedure is executed for a UE after transmission of the NAS query response, even though the UE intended to attach to the MF network via the selected MF cell, the UE can still send a connection request including the selected PSP, its registered UE-ID and a NAS service request after performing a RACH procedure but without repeating the NAS query procedure, since the PSP list is already available in the UE.

The invention can be implemented to a UE as a set of radio features and signaling procedures. The invention can be implemented as a network architecture elements and protocols executed therein. The UE can refer to any 3GPP device category including smart phones, laptops, wearables, machines and internet of things.

The invention has several advantages. It defines a 3GPP compatible standalone network, which can operate on the unlicensed frequency band satisfying the unlicensed spectrum access requirements such as bandwidth occupancy, power levels and listen-before-talk mechanisms.

The invention allows a UE accessing any local dimension network having e.g. Ethernet connectivity, to connect to a cellular packet core network element that is reachable locally.

In comparison to LTE aggregated WLAN solutions, this solution avoids the need of the eNB to configure the UE for a WLAN access, connection establishment. The invention avoids the need of UE to run different sets of protocols for its connectivity (i.e. UE can just run 3GPP instead of 3GPP+WLAN systems). Further, this allows simpler and more consistent control operation by the RRC Connection Reconfiguration compared to separately controlling 3GPP connection and WLAN connection.

In MF network, the UE is in LTE states both in the radio level (idle state and RRC Connected state/LTE connected state) and towards the core network UE is in the attached state (or detached state). Hence, having the MF network protocols, there is no need to introduce any change at radio level (specification and implementation). These issues are not faced in WLAN, neither these benefits can be reached in WLAN.

The invention with query has additional benefits, such as avoiding broadcasting long System Information messages with full service provider identity (e.g. FQDN), avoiding selection of access points which do not offer the preferred service or preferred service provider selection, avoiding selection of a network, which is not capable of serving with sufficient performance and quality, avoiding unnecessary switching from the idle state to the LTE connected state, and avoiding setting up the eps-bearer, interfaces and ATTACH, unnecessarily.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:
3GPP The 3rd Generation Partnership Project
ANQP Access Network Query protocol
CQI Channel Quality Indicator
EPC Evolved Packet Core Network, or a network element
EPS Evolved Packet System, in here including EPS, and/or MF EPS
FQDN Fully Qualified Domain Name
IP Internet Protocol
LAA Licensed Assisted Access of LTE
LBT Listen-Before-Talk mechanism to access unlicensed spectrum by LTE
LTE-U LTE operating in unlicensed frequency band
MME Management entity of the MF CN, or a Mobility Management Entity of the EPC
MF MuLTEfire; a local area scoped network with NAS access procedures
MF-AP Access point of a MF network
MF CN MF core network element
NAS Non-Access Stratum
PDCP Packet Data Convergence Protocol
PRB Physical Resource Block
QCI QoS Class Identifier
RRC Radio Resource Control
SDU Service Data Unit
TCP Transmission Control Protocol
UDP User Datagram Protocol
UE User Equipment

What is claimed is:

1. A method comprising:
   identifying at a user equipment an available access point for accessing a local area scoped network having non-access-stratum procedures and a network identity;
   transmitting from the user equipment a message to the access point, indicating a request for retrieving network information, wherein the information is queried from the network without authentication of the user equipment and before connecting by the user equipment to the network by a non-access stratum procedure;
   selecting a service provider, being available via the network and having no public land mobile network identity, based on received network information for binding the network identity to the selected service provider for accessing; and
   conveying a non-access stratum service request to the network to cause authentication of the user equipment for connecting to the network for access to the selected service provider.

2. The method according to claim 1, wherein the network information is exchanged with the network in at least one of Non-Access Stratum signaling and Radio Resource Control messages.

3. The method according to claim 1, wherein the network information comprises at least one of access information, information of at least one service provider of the network, and network metrics.

4. The method according to claim 3, wherein the metrics comprise at least one of
   a free channel airtime percentage, indicating a relationship between a time when a channel has been detected to be free and a time when channel has been detected to be occupied, over a measurement period;
   a Physical Resource Block load, indicated by a percentage of Physical Resource Blocks used per sub-frame averaged over a large number of sub-frames;
   a Physical Resource Block peak to average ratio, indicated by the ratio of the short term peak number of Physical Resource Blocks occupied divided by the long term average Physical Resource Block usage;
   an average Packet Data Convergence Protocol Service Data Unit delay between the access point and the user equipment; or
   a Channel Quality Indicator load averaged over a specific time, indicative of the interference load in the network.

5. The method according to claim 1, wherein no bearer establishment is allowed while the user equipment is attached to the network in a limited manner during the query procedure.

6. The method according to claim 1, wherein a temporary Cell Radio Network Temporary Identifier is used for signaling the allocations of radio resources.

7. A non-transitory computer-readable medium comprising code adapted to cause an apparatus to perform the steps of claim 1 in response to execution of the code by the apparatus.

8. A method according to claim 1, wherein the selected service provider offers authentication and connectivity via the network.

9. An apparatus comprising:
   at least one processor, and
   at least one memory for storing instructions to be executed by the processor,
   wherein the at least one memory and the instructions are configured to, with the at least one processor, cause the apparatus at least to perform
   identifying at a user equipment an available access point of the local area scoped network having non-access-stratum procedures and a network identity;
   transmitting from the user equipment a message to the access point, indicating a request for retrieving network information, wherein the information is queried from the network without authorization of the user equipment and before connecting by the user equipment to the network by a non-access stratum procedure;
   selecting a service provider, being available via the network and having no public land mobile network identity, based on received network information for binding the network identity to the selected service provider for accessing; and
   conveying a non-access stratum service request to the network to cause authentication of the user equipment for connecting to the network for access to the selected service provider.

10. The apparatus according to claim 9, wherein the network information is exchanged with the network in at least one of Non-Access Stratum signaling and Radio Resource Control messages.

11. The apparatus according to claim 9, wherein the network information comprises at least one of access information, information of at least one service provider of the network, and network metrics.

12. The apparatus according to claim 11, wherein the metrics comprise at least one of
   a free channel airtime percentage, indicating a relationship between a time when channel has been detected to be free and a time when a channel has been detected to be occupied, over a measurement period;
   a Physical Resource Block load, indicated by a percentage of Physical Resource Blocks used per sub-frame averaged over a large number of sub-frames;
   a Physical Resource Block peak to average ratio, indicated by the ratio of the short term peak number of Physical Resource Blocks occupied divided by the long term average Physical Resource Block usage;
   an average Packet Data Convergence Protocol Service Data Unit delay between the access point and the user equipment; or
   a Channel Quality Indicator load averaged over a specific time, indicative of the interference load in the network.

13. The apparatus according to claim 9, wherein no bearer establishment is allowed while the user equipment is attached to the network in a limited manner during the query procedure.

14. The apparatus according to claim 9, wherein a temporary Cell Radio Network Temporary Identifier is used for signaling the allocations of radio resources.

15. An apparatus according to claim 9, wherein the selected service provider offers authentication and connectivity via the network.

16. An apparatus including a function for enabling access of a user equipment to a local area scoped network having non-access-stratum procedures, comprising:
   at least one processor, and
   at least one memory for storing instructions to be executed by the processor,
   wherein the at least one memory and the instructions are configured to, with the at least one processor, cause the apparatus at least to perform
   receiving, at a local area scoped network having non-access-stratum procedures and a network identity, a message from a user equipment, before the user equipment is connected to the network by a non-access stratum procedure, wherein the message indicates a request for retrieving network information;
   accepting the request without authentication of the user equipment and transmitting network access information to the user equipment;
   upon receiving information about a selection of a service provider being available via the network and having no public land mobile network identity by the user equipment, binding the network identity to the selected service provider for accessing; and
   upon receiving a non-access stratum service request from the user equipment, allowing authentication of the user equipment for connecting to the network for access to the selected service provider.

17. An apparatus according to claim 16, wherein the selected service provider offers authentication and connectivity via the network.

18. A method comprising:
   receiving, at a local area scoped network having non-access-stratum procedures and a network identity, a message from a user equipment, before the user equipment is connected to the network by a non-access stratum procedure, wherein the message indicates a request for retrieving network information;
   accepting the request without authentication of the user equipment and transmitting network access information to the user equipment;
   upon receiving information about a selection of a service provider being available via the network and having no public land mobile network identity by the user equipment, binding the network identity to the selected service provider for accessing; and
   upon receiving a non-access stratum service request from the user equipment, allowing authentication of the user equipment for connecting to the network for access to the selected service provider.

19. A non-transitory computer-readable medium comprising code adapted to cause an apparatus to perform the steps of claim 18 in response to execution of the code by the apparatus.

20. A method according to claim 18, wherein the selected service provider offers authentication and connectivity via the network.

* * * * *